UNITED STATES PATENT OFFICE.

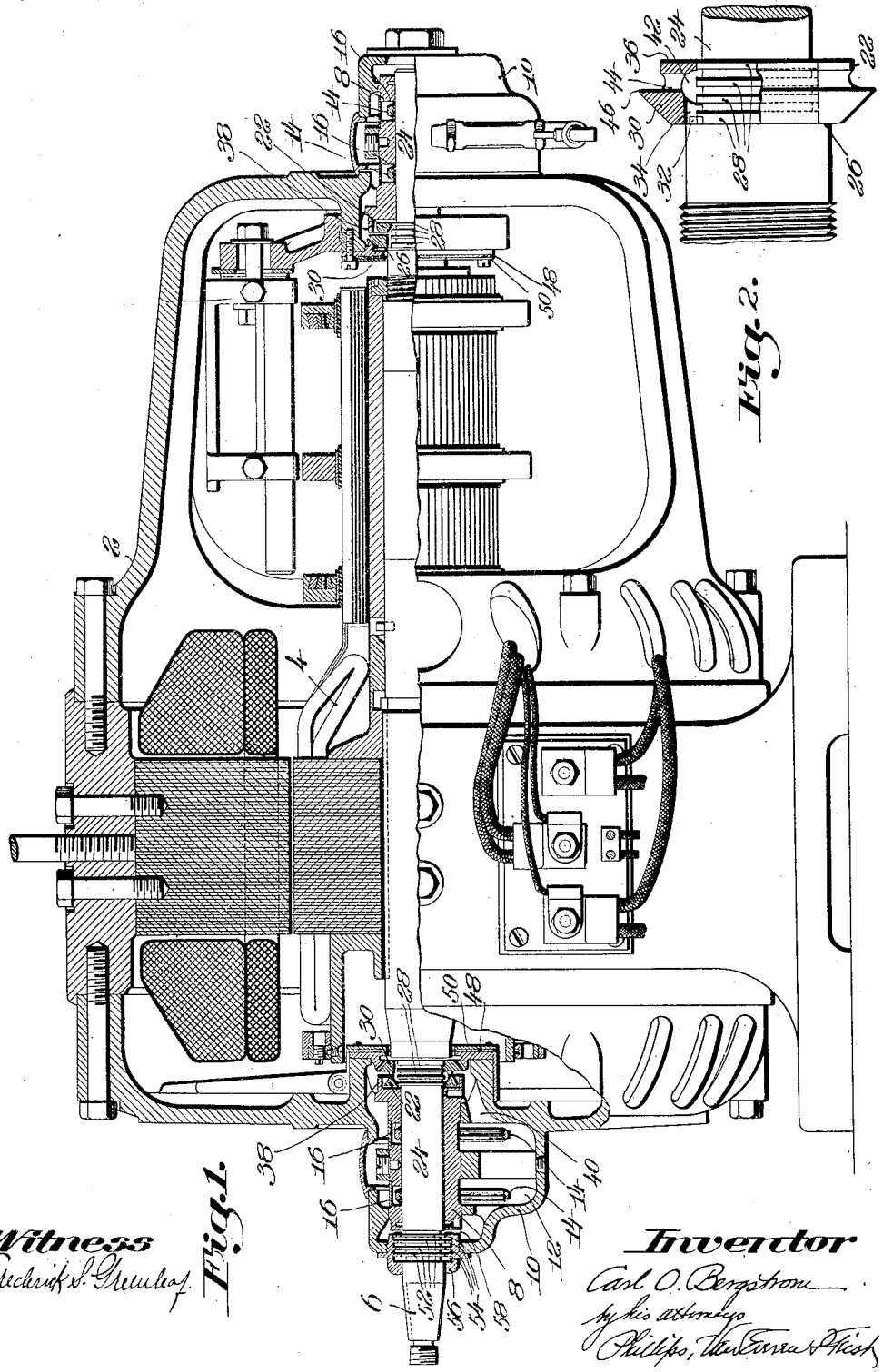

CARL O. BERGSTROM, OF BOSTON, MASSACHUSETTS, ASSIGNOR TO B. F. STURTEVANT COMPANY, OF BOSTON, MASSACHUSETTS, A CORPORATION OF MASSACHUSETTS.

OIL-DEFLECTOR.

1,224,260. Specification of Letters Patent. Patented May 1, 1917.

Original application filed August 12, 1912, Serial No. 714,618. Divided and this application filed June 24, 1915. Serial No. 36,113.

*To all whom it may concern:*

Be it known that I, CARL O. BERGSTROM, a citizen of the United States, residing at Boston, in the county of Suffolk and Commonwealth of Massachusetts, have invented certain new and useful Improvements in Oil-Deflectors, and I do hereby declare the following to be a full, clear, and exact description of the invention, such as will enable others skilled in the art to which it appertains to make and use the same.

The present invention is a division of Patent No. 1,191,393, dated July 18, 1916, and relates particularly to oil deflectors.

The object of the invention is to reorganize and improve the construction of such devices. With this object in view the present invention consists in the improvements in oil deflectors hereinafter described in the specification and particularly pointed out in the claims.

In the drawings which illustrate the preferred embodiment of the present invention, Figure 1 is a view taken partly in section of an electric motor or generator in which are embodied the improvements which constitute the subject of the present invention; and Fig. 2 is a detail view showing the oil deflector ring which is mounted on the armature shaft.

Referring to the drawings, Fig. 1 illustrates a high speed electric motor or generator 2 having its rotor or armature 4 carried upon a shaft 6 which is journaled in bronze bearing blocks 8 at either end of the machine casing. The bearing blocks 8 are supported in bearing boxes 10 in the lower parts of which are formed oil reservoirs 12 to hold the oil for lubricating the bearings. The oil is carried from the oil reservoirs 12 to the top of the shaft 6 by means of oil rings 14 which depend from the top of the shaft and run through straight sided grooves 16 cut in the tops of the bearing blocks 8. The oil rings constitute a separate invention from that covered in this application and consequently are not described specifically.

In order to prevent the oil from the bearings from running along the armature shaft 6 and getting into and damaging the armature, oil deflectors, indicated generally by reference numeral 22, are provided between each bearing and the armature. The ends of the shafts have reduced portions 24 journaled in the bearing blocks 8 leaving shoulders 26 which face outward from the armature, as illustrated particularly in Fig. 2. Between the reduced bearing portions 24 of the armature shaft 6 and the shoulders 26 are formed a number of peripheral ribs 28. Oil deflector rings 30 are slipped over the shaft and surround the ribs 28. The hole through each of these rings 30 is carefully reamed so that a close sliding fit of the ring 30 over the peripheral ribs 28 is secured. A pin 32 set in the shaft and engaged in a slot 34 in the ring 30 prevents the ring from turning on the shaft. The oil which runs along the shaft from the bearing first encounters the rib 28 which is farthest to the right, as shown in Fig. 2. The centrifugal force due to the rapidly rotating shaft causes the oil to flow out along this rib, and as the ring 30 makes a comparatively good fit over the rib, most of the oil flows from the rib out along the end face 36 of the ring 30 and is thrown outwardly. Each bearing block 8 has an overhanging flange 38 which projects over the end of the ring 30 and intercepts the oil which is thrown out along the end surface 36 of the ring. The oil intercepted by the flange 38 runs down through a return duct 40 into the oil reservoir 12 of the bearing. The oil which leaks through between the ring and the rib 28 which is farthest to the right, as viewed in Fig. 2, encounters the other ribs 28 which throw the oil outward from their sharp edges by centrifugal force. The oil which is thrown out from these ribs is caught in a groove 42 formed on the inner surface of the ring 30. Holes 44 are bored through the ring to form passages for the escape of oil which is collected in the groove 42 and permit the oil to be thrown outward. Just at the left of the passages 44, as shown in Fig. 2, the ring 30 has an outwardly projecting rib terminating in a sharp edge 46 which effectually prevents the oil thrown out through the passages 44 from passing over the outside of the ring 30 toward the armature. The oil which is thrown off through the passages 44 and the sharp edge 46 is collected by the bearing box 10 and is returned through the return duct 40 to the oil reservoir 12. The oil deflectors act to centrifugally throw practically all the oil off the shaft. However, to remove any trace of oil which may pass the deflectors, felt washers 48 are provided and are held in place on the inner ends of the bearing boxes 10 by means of thin brass plates 50. These felt washers fit against the shaft and not only absorb any oil that passes the oil deflectors, but also form a dust-tight bearing. The deflector rings 30 also serve as thrust collars for the shaft between the shoulders 26 and the inner ends of the bearing blocks 8. In making the rotor, it is impracticable to make large deflector flanges integral with the shaft because the shaft near the bearing must be at least of a diameter as small as the part of the shaft upon which is placed the armature. This necessitates the employment of oil deflector rings which can be placed upon the shaft after the shaft is passed through the armature. These deflector rings, as hereinbefore described, are removably put on so that the shaft can be taken from the armature. The fit between the shaft and the inside of the deflector rings 30, although machined as carefully as possible, cannot be an oil tight joint so that some oil is bound to leak between the oil deflector ring 30 and the shaft. The ribs 28 and the receiving slot 42 form a very effective combination for intercepting and deflecting from the shaft the oil which leaks through between the shaft and the deflecting ring 30.

As shown in Fig. 1, the extreme right hand end of the shaft 6 terminates within the bearing and needs no oil deflector. The extreme left end of the shaft, to which is connected a driving or driven machine, is protected against the leakage of oil from the bearing by a number of peripheral ribs 52 which are formed by slots cut in the shaft. These ribs act to intercept and centrifugally throw out the oil running along the shaft. This oil is caught in a number of peripheral grooves 54 on the inside of a bushing 56 and flows through a return duct 58 to the oil reservoir 12. Since the shaft extends beyond the machine casing to the left, and may be wiped, from time to time, the ribs 52 constitute a sufficiently good oil deflecting device for the left end of the bearing.

While the preferred embodiment of the present invention has been specifically illustrated and described, the present invention is not limited to the construction constituting its preferred embodiment, but may be embodied in other constructions within the scope of the invention as defined in the following claims.

I claim:

1. An oil deflector for a rotating shaft, comprising an annular rib on the shaft, and a deflector ring fitted over the shaft and having a groove in the inner surface surrounding the rib on the shaft to catch oil thrown outward from the rib and having passages to allow the oil thus caught to pass outwardly through the ring, substantially as described.

2. An oil deflector for a machine having a rotating shaft and shaft bearing, comprising a deflector ring fitted over the shaft to rotate therewith, a flange on the bearing extending from the edge of the deflector ring nearest the bearing to intercept oil thrown out from this side of the ring, and an annular rib on the shaft, said deflector ring having a groove in the inner surface surrounding the rib to catch the oil which passes from the bearing along the shaft between the ring and shaft and which is thrown outwardly from the rib and having passages extending from the groove to the outside of the ring to allow the oil caught in the groove to pass through the ring, substantially as described.

3. An oil deflector for a machine having a rotating shaft and shaft bearing, comprising a deflector ring fitted over the shaft to rotate therewith, a flange on the bearing extending over the edge of the deflector ring nearest the bearing to intercept the oil thrown out along this side of the ring, and an annular rib on the shaft, said deflector ring having a groove in the inner surface surrounding the rib to catch the oil which passes from the bearing along the shaft between the ring and shaft and which is thrown outwardly from the rib, and passages extending from the grooves to the outside of the ring to allow the oil caught in the grooves to pass through the ring, and having a sharp edge formed around the outside of the deflector ring between the passages and the side of the ring farthest from the bearing to prevent oil from passing over the outer surface of the ring, substantially as described.

4. An oil deflector for a machine having a rotating shaft and shaft bearing, comprising an annular rib on the shaft, a deflector ring fitted over the shaft and having a groove in the inner surface surrounding the rib on the shaft to receive oil thrown outwardly from said rib, and passages to allow the oil thus caught to pass outwardly through the ring, and having a sharp edge formed around the outside of the ring between the passages and the side of the ring farthest from the bearing to prevent oil from passing over the outer surface of the ring, substantially as described.

CARL O. BERGSTROM.

Copies of this patent may be obtained for five cents each, by addressing the "Commissioner of Patents, Washington, D. C."